United States Patent [19]

Beaston

[11] 4,214,370
[45] Jul. 29, 1980

[54] HOOF ALIGNMENT TOOL
[76] Inventor: Bud A. Beaston, Rte. 1, Box 88, Sperry, Okla. 74073
[21] Appl. No.: 931,505
[22] Filed: Aug. 7, 1978
[51] Int. Cl.² .............................................. A01L 11/00
[52] U.S. Cl. .......................................... 33/195; 168/45
[58] Field of Search .......................... 168/45, 47, 19, 7; 33/195, 174 D

[56] References Cited
U.S. PATENT DOCUMENTS

| 583,706 | 6/1897 | Kearns et al. | 33/195 |
| 602,952 | 4/1898 | Millett | 33/195 |
| 832,060 | 10/1908 | Holmquist | 33/195 |
| 1,071,128 | 8/1913 | Zettervall | 168/19 |

Primary Examiner—Hugh R. Chamblee
Attorney, Agent, or Firm—James H. Chafin

[57] ABSTRACT

The hoof alignment apparatus for measuring the size and determining the shape of a horse's hoof. The apparatus comprises a pair of pivotal arms which may be closed around the outer hoof wall whereby longitudinal and circumferential measurements may be made of the hoof. The apparatus includes a straightedge member for determining the hoof length at various positions around the hoof and for measuring the angle of the wall with respect to the base of the hoof.

5 Claims, 6 Drawing Figures

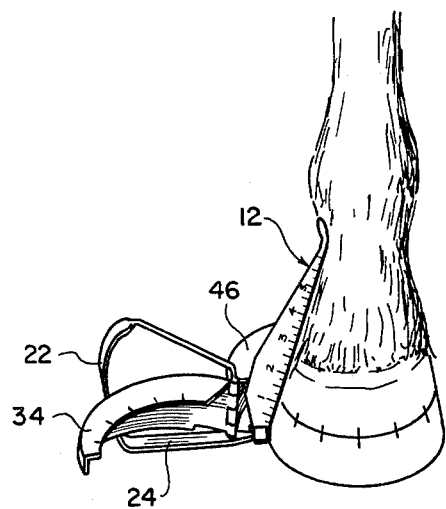
Fig. 5
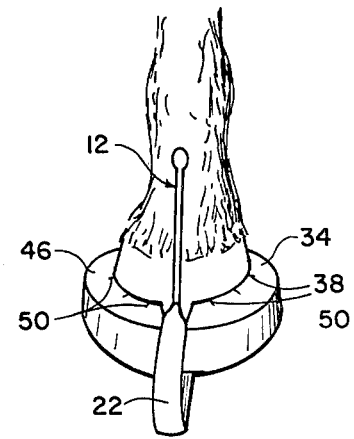
Fig. 3
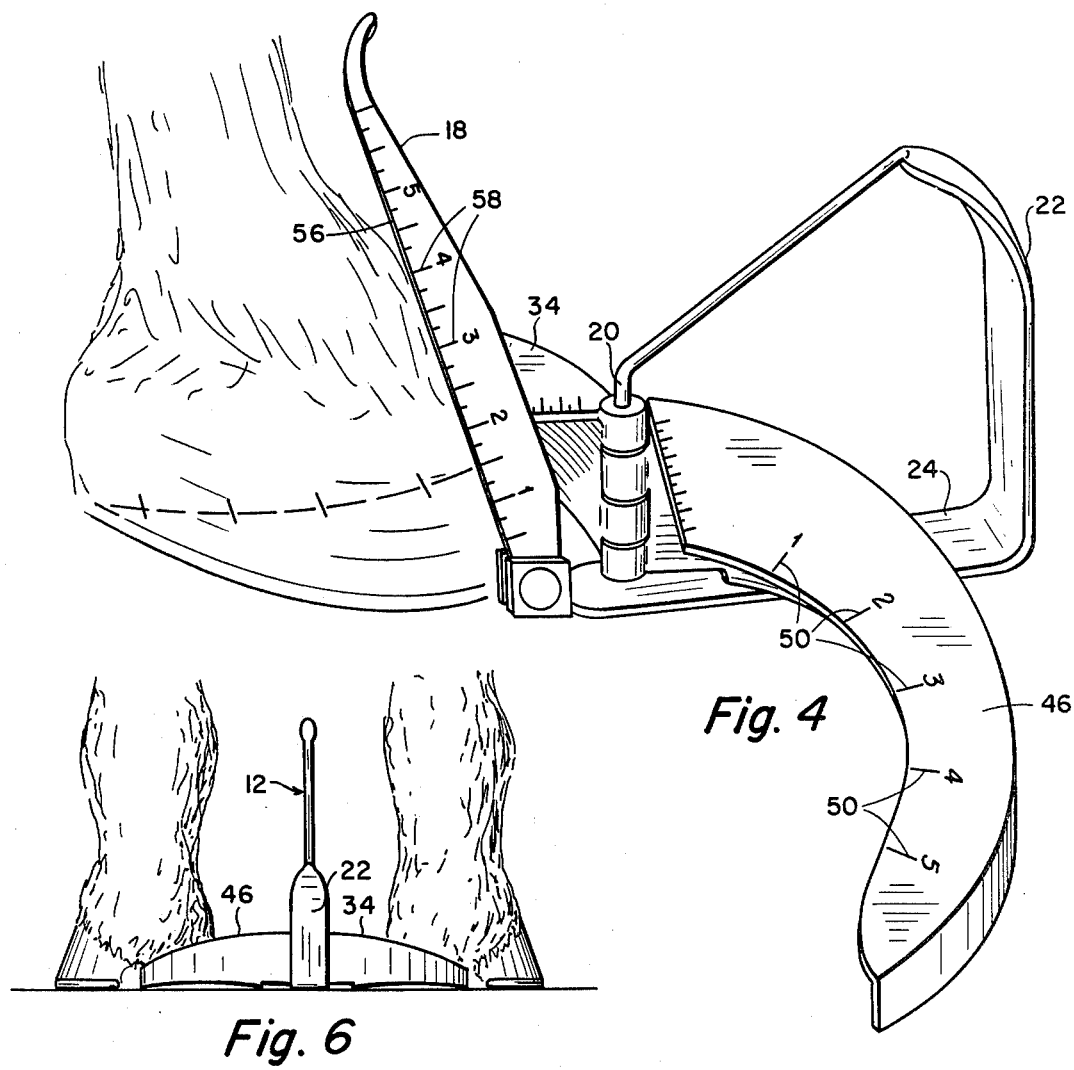
Fig. 4
Fig. 6

HOOF ALIGNMENT TOOL

BACKGROUND OF THE INVENTION

1. Field of the Invention

The present invention relates to a farrier's tool and more particularly but not by way of limitation, to a hoof alignment tool for aiding farriers in the trimming and shoeing of horse's hooves.

2. History of the Prior Art

Constant hoof growth coupled with uneven wear requires frequent attention by a trained farrier in order to prevent lameness and to assure that a horse performs at its best.

A problem that has plagued farriers over the years is that of assuring that each horse's hoof is trimmed to the proper size and also to the proper shape so that each hoof strikes the ground at the proper angle. This is particularly important in the case of high stepping show horses such as the American saddle bred and the Tennessee walking horse.

In many cases, wedge pads have to be inserted between the horseshoe and the hoof to insure proper alignment. Heretofore, crude measurement tools have been used for this purpose along with good "eyeball estimates" made by the farrier which somtimes work out all right but ofter result in uneven stepping, lameness or accidents.

SUMMARY OF THE INVENTION

The present invention provides a hoof alignment apparatus particularly designed and constructed to permit a farrier to trim and shoe a horse such that the hooves are all the same size and shape resulting in balanced hoof movement.

The apparatus comprises a pair of arcuate arm members which are pivotally connected and may be closed around a horse's hoof. The pivot portion of the apparatus is positioned at the front center of the hoof and the hoof is then marked with a chalk or crayon at discrete points around the hoof. The apparatus also comprises an elongated straightedge member which can be used to measure the length of the hoof to the edge of the hairline at each of the discrete points.

The straightedge member is pivotally attached to the base of the apparatus such that the angle of the hoof with respct to the bottom thereof may be measured at each of the discrete points. The farrier then has the required information to allow him to properly trim the hoof and to add any build up pads or wedges in order to put the hoof into the desired shape and size.

DESCRIPTION OF THE DRAWINGS

Other and further advantageous features of the present invention will hereinafter more fully appear in connection with a detailed description of the drawings in which:

FIG. 3 is a front prospective view of the device of FIG. 1 in use.

FIG. 4 is a side prospective view of the device in use.

FIG. 5 is a second side prospective view of the device in use.

FIG. 6 is a second frontal prospective view of the device in use.

DESCRIPTION OF THE PREFERRED EMBODIMENT

Figure 1:
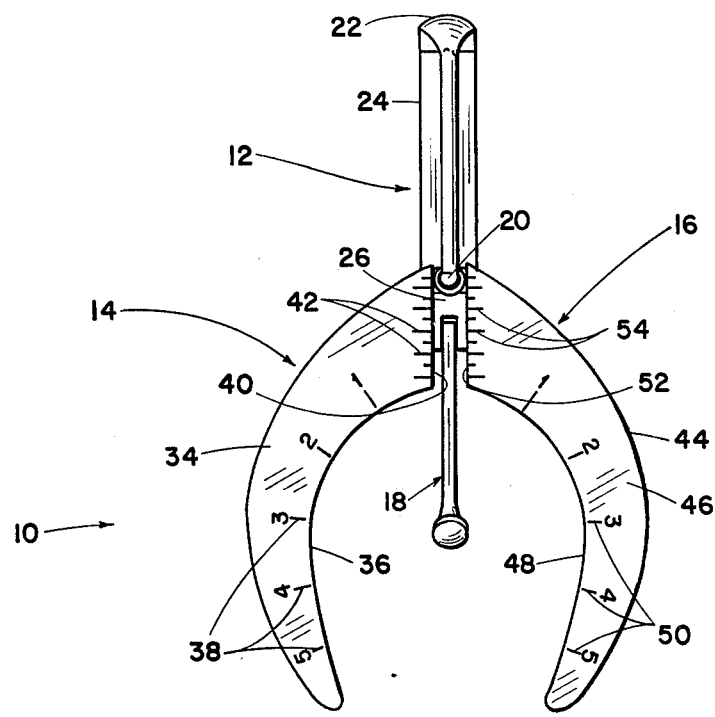
FIG. 1 is a plan view of a hoof alignment apparatus embodying the invention.

Referring to the drawings in detail, reference character 10 generally indicates a hoof alignment apparatus comprising a hinge pin assembly 12, a pair of arcuate arm members 14 and 16 pivotally attached to the hinge assembly 12 and a pivotal straightedge member 18.

The hinge pin assembly 12 comprises a vertically disposed cylindrical pin member 20 the upper end thereof being attached to a handle member 22 which may be made as an integral part of the hinge pin 20. The lower end of the hinge pin 20 is attached to a base plate 24. A second horizontal pin member 26 is carried by the end of the base plate 24 opposite the handle member 22 for a purpose that will be hereinafter set forth.

The arcuate arm member 14 comprises an arcuate curved sidewall member 26, the base portion 28 thereof lying in a common plane with the base plate 24. The arm member 14 also comprises a pair of vertically spaced registered pin sleeves 30 and 32 which are hingedly attached to the hinge pin 20 for horizontal rotation with respect thereto.

An inwardly extending flange plate 34 is attached along the upper surface of the sidewall 26, the plane of which is inclined with respect to the plane of the base portion 28 of the side wall 26. The flange plate 34 also comprises an inner concave arcuate surface 36 which is of substantially the same shape as the outer hoof wall of a horse's hoof and is provided with a plurality of measuring indicia 38 therealong. One end of the flange plate 34 is provided with a flattened surface 40 which is tangent to the hinge pin 20 and is provided with a second set of indicia 42 for a purpose that will be hereinafter set forth.

The arcuate arm member 16 is made as a mirror image of the arm member 14 and comprises a sidewall portion 44, one end being provided with hinge pin sleeves 45 and 47 for receiving the pin 20 therethrough, an inwardly extending flange member 46 having an inner arcuate or concave surface 48. The arcuate surface 48 is provided with a plurality of indicia 50 therealong for a purpose that will be hereinafter set forth. The end of the arcuate flange plate 46 is also provided with a flattened surface 52 also tangent to the pin member 20 and provided with a plurality of indicia 54 for a purpose that will be hereinafter set forth.

The straightedge member 18 is pivotally attached at one end thereof to the transverse pin member 26 which is carried by one end of the base plate 24. Therefore it can be seen that the straightedge member 18 is pivotal in a plane perpendicular to the plane of the base plate 24 and arcuate arm member base 28.

The inner surface of the straightedge member 18 is provided with a flat straight surface 26 which is provided with a plurality of indicia 58 therealong for linear measurements. The opposite side of the strainghtedge member 18 is provided with a flat straight surface 60 which cooperates with the indicia 42 and 54 of the arm members 14 and 16 in order to determine the angle of the straightedge surface 56 with respect to the plane of the base plate 24 and base surface 28.

Figure 2:
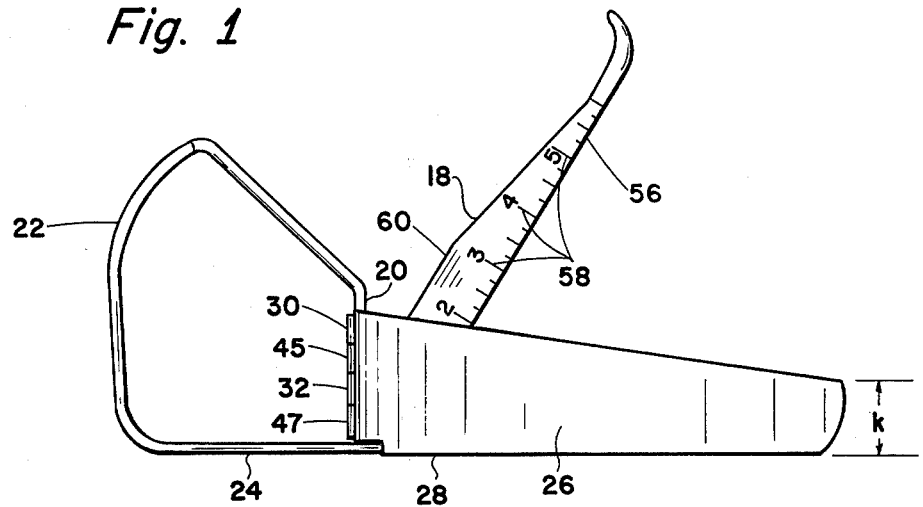
FIG. 2 is a side elevational view of the device of FIG. 1.

The height as shown in FIG. 2 of the outer edges of the flange plates 34 and 46 is preset to correspond to the average height of the heel portion of the horse's hoof standing on a flat surface, again for a purpose that will be hereinafter set forth.

Referring now to FIGS. 3 through 6, the following is a step by step procedure of the use of the alignment tool for measuring the shape and the size of a horse's hoof.

The horse's hoof is placed on a flat surface and the arcuate arm members are spread apart and then closed around the horse' hoof as shown in FIG. 3 with the hinge pin assembly 12 being aligned directly with the front of the hoof. A chalk or crayon (not shown) is then used to scribe circumferential lines indicated by reference characters 62 and 64 around the juncture of the horse's hoof wall and the arcuate arm concave surfaces 36 and 48, respectively. Vertical lines are then marked as indicated by reference character 66 corresponding to the indicia marking 38 and 50 provided along said arcuate concave surfaces 36 and 48.

The elongated straightedge member 18 is then moved toward the horse's hoof until the straightedge surface 56 is in contact with the wall of the horse's hoof. The length of the horse's hoof from the lower edge to the hairline may then be determined using the indicia 58 provided on the straightedge surface 56. The angle of the hoof wall with respect to the base of the hoof is then determined utilizing the indicia 42 and 54 in conjunction with back edge 60 of the straightedge member 18, all as shown in FIG. 4.

The alignment device may then be moved to various positions around the horse's hoof whereby similar length and angular measurements may be made for each discrete mark 66 that has been made on a horse's hoof, as shown in FIG. 5.

To determine the relative height of the heel portions of the horse's hooves may be accomplished by opening the arms 14 and 16, as shown in FIG. 6, and placing the outer ends of the arcuate arms adjacent the heel portions of the horse's hoof. It can be seen, as shown in FIG. 6, whether or not the heel portions are of an equal height or within an acceptable range.

By performing the above outlined operations, the farrier may determine the shape and size of each horse's hoof which will enable him to properly trim a horse's hoof and add any additional wedges or pads to the horse's hoof to achieve the desired size and shape of each hoof.

It is further noted that since for every indicia mark 38 along the arcuate arm edge 36, there is a corresponding indicia mark 50 along the arcuate edge surface 48. Therefore, the farrier, by making a mark 64 corresponding to each of the indicia marks around each side of the horse's hoof, he or she will be able to determine the proper hoof length and angle for corresponding positions on each side of the hoof.

From the foregoing, it is apparent that the present invention provides a hoof alignment device which is particularly adaptable for taking discrete measurements of a horse's hoof to determine the hoof shape and size so that the hoof may be properly trimmed and shoed in order to equalize or balance hoof movement. Likewise the device may be used for simple measurements of the hoof to compare these measurements with standardized data to determine whether or not proper growth is being achieved or whether or not the hoof has the proper shape in the first place which very sharply affects the value of the horse.

Whereas, the present invention has been described in particular relation to the drawings attached hereto, other and further modifications apart from those shown or suggested herein may be made within the spirit and scope of the invention.

What is claimed:

1. A hoof alignment device for measuring and determining the shape of a horse's hoof, the device comprising:
    (a) a vertical hinge member;
    (b) a pair of arm members each having one end hingedly attached to the hinge member and pivotal in a substantially horizontal plane, each arm member having an inwardly facing concave arcuate edge surface substantially conforming to the shape of a horse's hoof wall, each said arcuate edge surface terminating with a straight edge surface near the hinge member;
    (c) a straightedge member having one end pivotally carried by the lower end of the hinge member and being pivotal in a substantially vertical plane, said straightedge member being pivotal adjacent the said arm member straight edge surfaces; and
    (d) a first set of opposing measurement indicia provided along each arcuate edge surface, a second measurement indicia provided along the straightedge member, and a third set of opposing measurement indicia provided on the straight edge surface of the arm members adjacent the straightedge member to measure the angle of the straightedge member with respect to the horizontal plane.

2. A hoof alignment device as set forth in claim 1 wherein each of the arm members comprise a planar base surface along the bottom thereof for alignment with the plane of the lower surface of the horse's hoof, said arcuate edge surfaces being provided above the base surfaces and lying in a plane inclined with respect to the horizontal plane of said base surfaces.

3. A hoof alignment device as set forth in claim 1 wherein the hinge member comprises a handle member.

4. A hoof alignment device for measuring and determining the shape of a horse's hoof, the device comprising:
    (a) an elongated base plate defining a horizontal plane;
    (b) a vertical hinge member secured to the base plate near a first end thereof;
    (c) a straightedge member pivotally secured to said first end of the base plate and being pivotal in a vertical plane;
    (d) a pair of arm members, each having one end hingedly secured to the hinge member, each said arm member having a lower arcuate edge surface substantially conforming to the shape of the lower edge of a horse's hoof and lying in said horizontal plane, and an inwardly extending upper arcuate edge surface substantially conforming to the shape of a horse's hoof wall, each said upper arcuate edge terminating in a straight edge surface near the hinge member; and
    (e) a first set of opposing measurement indicia provided along each upper arcuate edge surface, a second measurement indicia provided along the straightedge member, and a third set of opposing measurement indicia provided on the straight edge surfaces of the arm members, said third indicia cooperating with the straightedge member to measure the angle of the straightedge member with respect to said horizontal plane.

5. A hoof alignment device as set forth in claim 4 wherein said upper arcuate edge surfaces lie in a plane which is inclined with respect to aid horizontal plane.

* * * * *